Oct. 31, 1944.

V. T. PARÉ

2,361,492

DIAMOND SAW AND METHOD OF MAKING THE SAME

Filed Oct. 1, 1942

Inventor
VICTOR T. PARÉ

By
Attorney

Patented Oct. 31, 1944

2,361,492

UNITED STATES PATENT OFFICE 2,361,492

DIAMOND SAW AND METHOD OF MAKING THE SAME

Victor T. Paré, Collingswood, N. J., assignor to Radio Corporation of America, a corporation of Delaware Application October 1, 1942, Serial No. 460,426

3 Claims. (Cl. 51—298)

My invention relates to improvements in diamond saws and to a novel method of making such saws.

Diamond saws having blades constituted of moldable materials such for example as powdered metal or synthetic resinous materials and wherein the diamond particles or bort are distributed in the moldable material have recently found wide favor and have, to a considerable extent, supplanted solid metal saws wherein the diamond particles are simply rolled, hammered, or otherwise set in the edge of the blade or disc. Regardless of the advantages claimed for diamond saws made of moldable materials, it may be said generally that they are brittle and break easily when subjected to severe stresses and strains such as are occasionally encountered during normal use.

Accordingly the principal object of my present invention is to provide an improved diamond saw and one which obviates the foregoing and other less apparent disadvantages of present-day saws of the general character described.

Another and related object of my invention is to provide a simple, inexpensive and trouble-free method of making such a saw.

The foregoing and other objects are achieved in accordance with my invention by the provision of a metal saw comprising a number of relatively flexible, thin, metal blades or discs having diamond particles embedded in the side or major faces thereof with the blades intimately bonded one to another into a composite structure as by means of solder or a synthetic resinous material.

Figure 1:
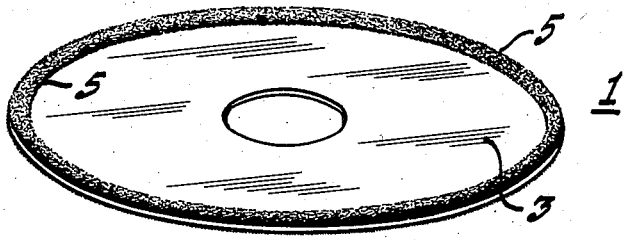
Figure 2:
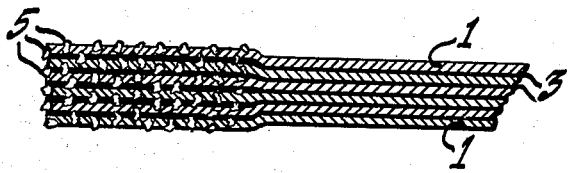
Figure 3:
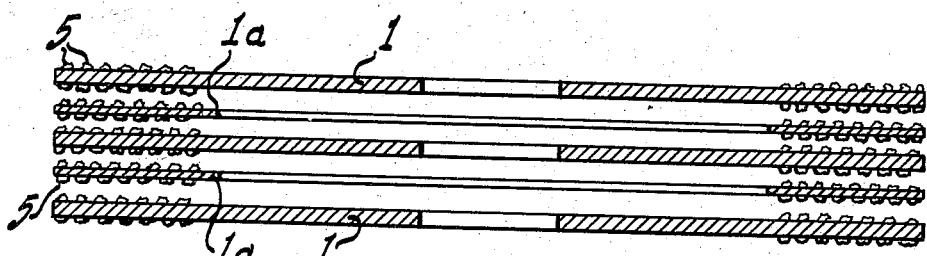
Figure 4:
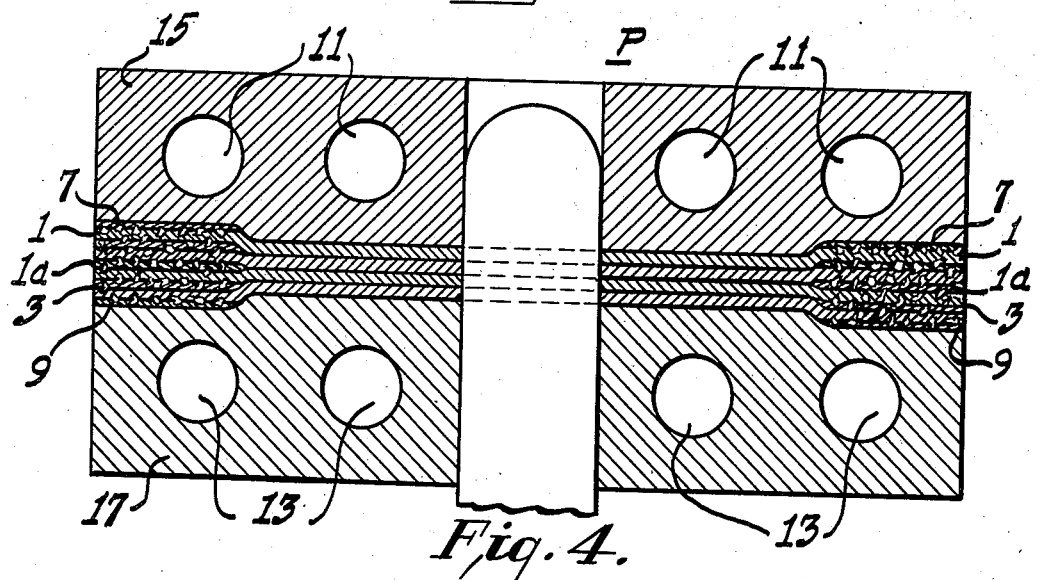

Certain preferred details of construction together with other objects and advantages will be apparent and my invention itself will be best understood by reference to the following specification and to the accompanying drawing, wherein:

Figure 1 is a view in perspective of a single metal disc which has been provided with bort on its major surfaces and shown prior to its assembly with other parts into a composite cutting wheel or saw within my invention, Figure 2 is an enlarged fragmentary view of a saw constructed in accordance with my invention and comprising a stack of thin, metal discs similar to the one shown in Fig. 1, with the diamond particles embedded in the metal, Figure 3 is an exploded sectional view of an alternate embodiment of my invention, and Figure 4 is a sectional view of a press adapted for uniting the several blade sections of Figs. 1, 2 and 3 into a composite structure.

In carrying my invention into effect, I start with a number of thin metal sheets or discs 1 which may be about .010 of an inch thick and constituted of soft steel, copper, brass, or other relatively flexible material, and after cleaning them thoroughly as with phosphoric acid, trichloroethylene, or equivalent cleansing material, I provide the major surfaces of each disc with a thin, fluid coating 3 of a thermoplastic resin such, for example, as polyvinyl acetate, which is then permitted to dry in order to free the resin of any bubble forming solvents originally contained therein. I then apply diamond bort to the said coated major surfaces of the separate blades, preferably in the form of a narrow band (5 Fig. 1) constituted of a paste comprising the same resin and containing crushed bort of the desired particle size, and permit the paste to dry. Thereafter, I assemble a stack (say, five) of these pre-coated metal parts between two relatively soft press pads 7 and 9 in a press P (Fig. 4) which is preferably provided with means, such as the conduits 11 and 13 in its head 15 and platen 17, for selectively heating and chilling the stack. Prior to softening the thermoplastic bonding material by the application of heat, I subject the stack to pressure in order to embed the diamond particles, of which the bort 5 is comprised, into the metal discs 1 (as shown in Fig. 2). The press pads 7 and 9 prevent the particles on the outer surfaces of the stack from becoming embedded in or marring the surface of the press. If necessary, I may circulate water or other cooling fluid through the conduits 11 and 13 in order to maintain the stack below the softening temperature of the thermoplastic while the diamond particles are being pressed into the metal laminations. This cold pressing operation prevents the said particles from being displaced or carried away with the fluid exudate resulting from the subsequent application of heat and pressure to the thermoplastic bonding material. After the cold pressing operation and with the stack still under pressure, I subject the interposed thermoplastic material to a temperature at least sufficiently high to cause it to soften and flow and then complete the bonding operation by permitting the stack to cool while under pressure. The heat may be applied to the stack by circulating steam through the conduits 11 and 13. Ordinarily the pressure employed in the bonding operation need not exceed 3000 lbs. per square inch of stack surface and in any event need not be of the same high order of intensity employed in the manufacture of saws by methods involving the use of powdered metal.

Where, as in the above described embodiment of my invention, a synthetic resinous material is selected as the bonding material, I prefer to use the "thermoplastic fusion process" described in copending application Ser. No. 359,129 to Gregory W. Blessing, filed September 30, 1940. That is to say, I may employ bonding temperatures greatly in excess of that required to render the thermoplastic fluid, yet not so great as to cause complete pyrolysis of the said material. The exact temperature employed may differ with different materials (it is ordinarily between 200 degrees and 300 degrees C.) but is achieved in all cases when the resin changes color and presents a "scorched appearance" or assumes a brownish or straw-colored hue.

As previously indicated I may use ordinary metal solder instead of a synthetic resinous material as the bonding agent, in which case the temperature employed in sweating the adjacent solder coated surfaces of the blades together need be substantially no greater than is required to cause the solder to flow. As in the earlier described embodiment of my invention the fluid carrier employed in the paste containing the diamond bort may comprise a thermoplastic resin. Alternatively, it may be mixed with the solder which is then applied in a molten state to the blades or discs 1.

In order to increase the flexibility of the body of the saw I may make the intermediate layers 1a (see Figs. 3 and 4) in the form of narrow rings of the same outside diameter, but of a greater inside diameter, than the top and bottom discs or layers here shown. Alternatively, these ring like laminae may be affixed to one or more centrally disposed discs. In any event, as is well understood, the finished saw should be thicker at the rim than it is at its central or body portion in order to prevent its jamming in the kerf.

Various other modifications of my invention will suggest themselves to those skilled in the art to which it appertains. Accordingly, the foregoing should be interpreted as illustrative and not in a limiting sense except as required by the prior art and by the spirit of the appended claims.

I claim as my invention:

1. Method of making a saw which comprises coating the major surfaces of a plurality of metal sheets with a thermoplastic bonding material, permitting said bonding material to harden, applying bort to said dry coated-surfaces, stacking said sheets, subjecting said stack to a compression force of an intensity sufficient to embed the particles, of said bort, in said metal while cooling said stack to a temperature below the softening point of said thermoplastic bonding material, thereafter subjecting said compressed stack to pressure and to a temperature sufficient to soften said thermoplastic bonding material to bond said sheets, and finally permitting the stack to cool while under pressure.

2. The invention as set forth in claim 1 and wherein said thermoplastic comprises metal solder applied to the adjacent surfaces of said metal blades.

3. The invention as set forth in claim 1 and wherein said thermoplastic comprises a synthetic resinous material and said stack is subjected to a temperature sufficient to melt said resinous material during the bonding operation.

VICTOR T. PARÉ.